No. 27,002. PATENTED JAN. 31, 1860.
M. McDOWELL & N. W. WHEELER.
COMBINING LOCOMOTIVE ENGINE AND CAR.
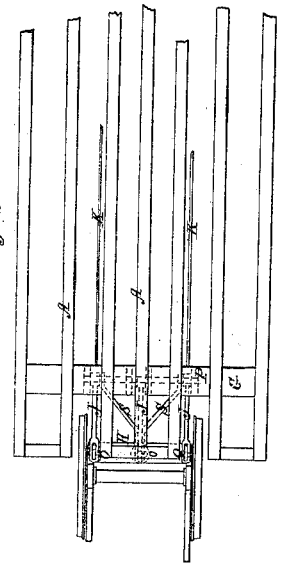
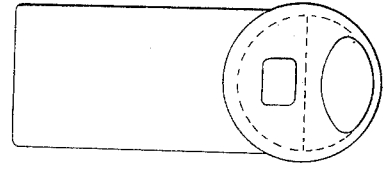
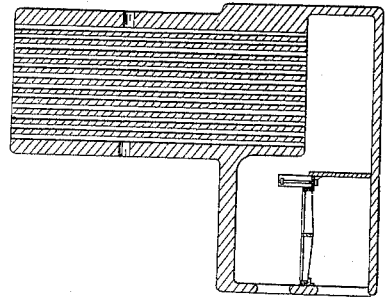
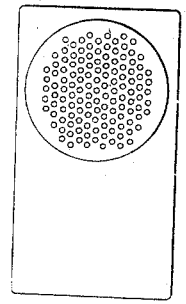
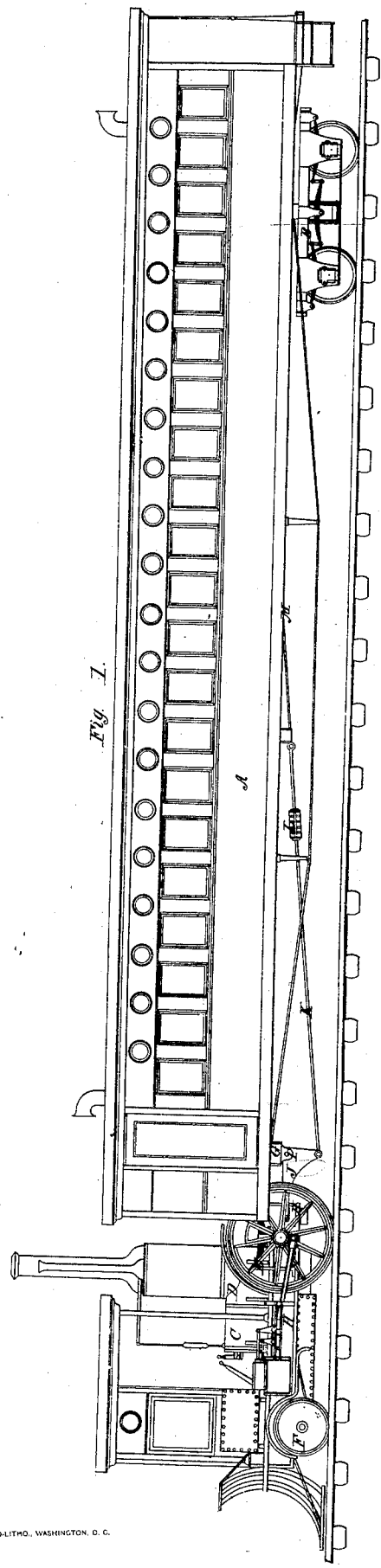

UNITED STATES PATENT OFFICE.

M. McDOWELL AND N. W. WHEELER, OF NEW YORK, N. Y.

COMBINING LOCOMOTIVE-ENGINES AND CARS.

Specification of Letters Patent No. 27,002, dated January 31, 1860.

*To all whom it may concern:*

Be it known that we, MALCOLM MC-DOWELL, of the city, county, and State of New York, and NORMAN W. WHEELER, of Brooklyn, in the county of Kings and State of New York, have invented certain new and useful Improvements in Locomotive - Engines and Cars for Railway and other Purposes and in Their Combination; and we do hereby declare and ascertain said improvements as follow, referring to the accompanying drawing, in which—

Figure 1, is an elevation of the engine and car; Fig. 2, a plan of a part of the engine frame and bottom of the car-body.

Our invention consists in so constructing and combining the locomotive engine and car, as to support the front end of the car upon the rear end of the engine frame, so that the weight of the car and its load, will contribute to increase the adhesion of the driving wheels by which they are supported, and at the same time retain a flexibility sufficient, between the car body and engine frame to secure safety in running around curves, and an easy motion of the car.

The construction and arrangement of the several parts, is as follow:

Referring to the drawings, *a*, in Figs. 1 and 2, indicates the car body. This is like an ordinary car body, fitted for baggage and passengers, or otherwise. B, is the car truck that supports the rear end of the car body, this is made and attached in the usual manner of ordinary passenger cars.

The locomotive engine C, may be of any convenient construction, or as delineated in the drawing, in which D, is the boiler; E, driving wheels; F, the truck, and H, the frame of the engine upon the rear end of which we place the bearing pieces *o, o, o*, which support the forward ends of bell cranks or bent levers J, J, by which the front end of the car is supported and coupled with the engine. The pieces *o*, should be three in number. The center one serves as a coupling, or drawbolt. It is affixed to the frame of the locomotive engine by a king-bolt or link that passes down through it, and allows the bearing piece *o*, to swivel horizontally. The center bent lever J, has the front end of its horizontal arm resting between two lugs on the upper side of piece *o*, and is secured to it by a bolt that runs through them all. The other bent levers are placed one on each side, and rest on rollers placed upon the outside bearing pieces *o, o*, or suspended by links so as readily to slide, in turning a curve, and thus secure a flexible connection and bearing, of the car with the engine. The bent levers or bell cranks J, (three in number) are affixed at their angles to the under side of the car frame by a rod or axis P, which passes through them, and attaches them to the cross-beam G, of the car body, being supported in proper bearings affixed thereto. The lower ends of the vertical arms of these bent levers J, are connected with tension rods K, that extend back to a point M where they are affixed to the car-body. There is a spring introduced into the tension rods K, at L, which relieves the bent levers J, from a rigid connection and gives a little vertical play to the horizontal arm of the bent lever J, that supports the front end of the car body and thus causes it to rest on an elastic medium and giving it an easy motion while running.

To prevent a lateral oscillation of the front end of the car body, or an improper strain upon the bent levers J, a diagonal brace *s*, is fastened on each side of the central or coupling bent lever J, by which it is rigidly braced against lateral movement. The braces abut on the shaft P.

The two outer bearings *o, o*, that are affixed to the engine, have grooves formed in their upper surfaces, in which small rollers, or their equivalents, run, that are affixed to the under sides of the bent levers J, that rest on them. This produces an easy adjustment of the various parts in turning curves.

It is obvious that the engine as shown and described, may be used as an ordinary locomotive by disconnecting the car body, and attaching an ordinary draw-bar, instead of the central bell-crank, so that it may be used to haul ordinary cars with convenience.

It is well known that the locomotive engines in common use are made much heavier in some of their parts than is requisite for strength, for the purpose of securing sufficient adhesion of the drivers to the track to haul their heaviest loads, and when hauling lighter loads, much useless weight is carried; while it is obvious that in our steam car a part of the weight of the car and its load forward of the bolster of the truck B, is transferred, by means of the bell cranks, to the engine frame, and thus contributes to the adhesion of the drivers; hence the engine needs but little weight within itself to give sufficient adhesion to haul the car, and can be made with just sufficient material to secure the requisite strength,—for the adhesion of the drivers will be increased and diminished directly as the load in the car.

We support the forward end of the car body upon the bell-cranks for the purpose of supporting it some distance back from its extreme end, so that the strength of its longitudinal timbers may be less than would be necessary if it were supported at the end. But it is obvious that the effect contemplated by our invention can be produced by other means than the specific construction described; for instance, where the construction of the engine frame will allow, it may be convenient to substitute hangers for the rollers and blocks o, o, so that the front ends of the bent levers j, j, j, may be suspended from a point upon the engine frame, the free swinging of the suspension-rods or hangers giving sufficient flexibility for practical purposes.

In cases where it is not desirable to transfer the point of support back from the end of the car-body, it will suffice to make the connection or coupling by means of springs projecting horizontally forward from the car-body, and rollers, and bearings or hangers upon the engine frame, the flexibility of coupling being maintained as before described.

We intend this specification to apply to all land carriages comprised of a car and a locomotive which carries the front end of the carriage, for it is obvious that if we should remove the flanges from the drivers E, E, make the truck F, similar to the fore wheels of a vehicle drawn by horses, attach thereto a proper steering apparatus, and substitute a single pair of wheels for the truck B, we should have a steam-car capable of running upon common roads with the locomotive detached and the car distinct from, yet partially borne by, the locomotive.

Having thus fully described our combined car and locomotive engine, we claim—

The employment of a car body substantially as herein described in combination with a locomotive capable of action independent of the car but when combined therewith forming the entire support of the forward end of the car the combination of the two being such as to firmly support the car body preventing undue oscillation and vibration while a sufficiently flexible connection is maintained to properly turn curves, &c., all as herein specified.

MALCOLM McDOWELL.
NORMAN W. WHEELER.

Witnesses:
Jas. W. Fraser,
Wm. L. W. Chapman.